(No Model.) 2 Sheets—Sheet 1.

G. M. ANDREWS.
ANIMAL TRAP.

No. 438,133. Patented Oct. 14, 1890.

Witnesses
Sam'l R. Turner
Van Buren Hillyard

Inventor
George M. Andrews
By his Attorney
R. S. & A. B. Lacey (No Model.) 2 Sheets—Sheet 2.

G. M. ANDREWS.
ANIMAL TRAP.

No. 438,133. Patented Oct. 14, 1890.

Witnesses
Saml. R. Turner
Van Buren Hillyard

Inventor
George M. Andrews.
By his Attorneys

UNITED STATES PATENT OFFICE.

GEORGE M. ANDREWS, OF SOUTH SHORE, SOUTH DAKOTA.

ANIMAL-TRAP.

SPECIFICATION forming part of Letters Patent No. 438,133, dated October 14, 1890.

Application filed December 21, 1889. Serial No. 334,489. (No model.)

*To all whom it may concern:*

Be it known that I, GEORGE M. ANDREWS, a citizen of the United States, residing at South Shore, in the county of Codington and State of South Dakota, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to traps of that class which are set by the animal in the act of passing from one compartment to another.

The object of the invention is to dispense with all springs and have the trap-doors weighted and operate in a positive manner, so that an entrapped animal cannot possibly escape.

The improvement consists of the novel features which will be hereinafter more fully described and claimed, and which are shown in the annexed drawings, in which—

Figure 1:
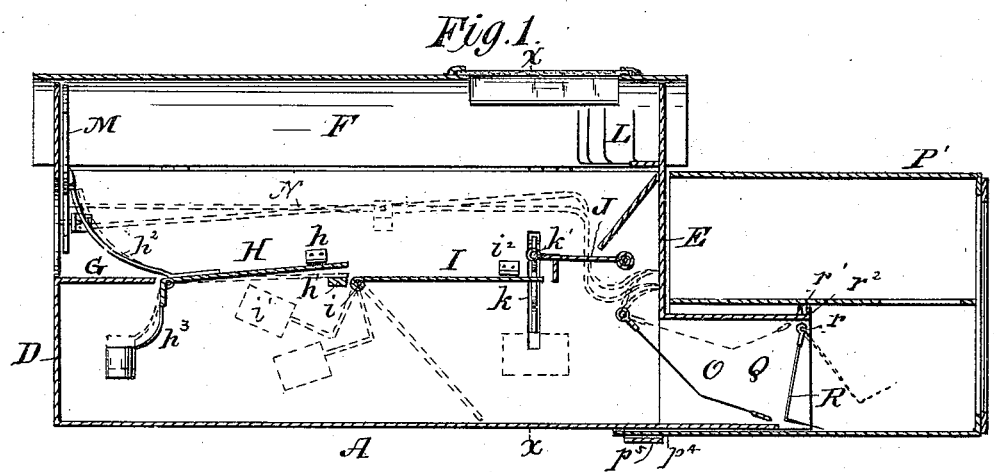
Figure 2:
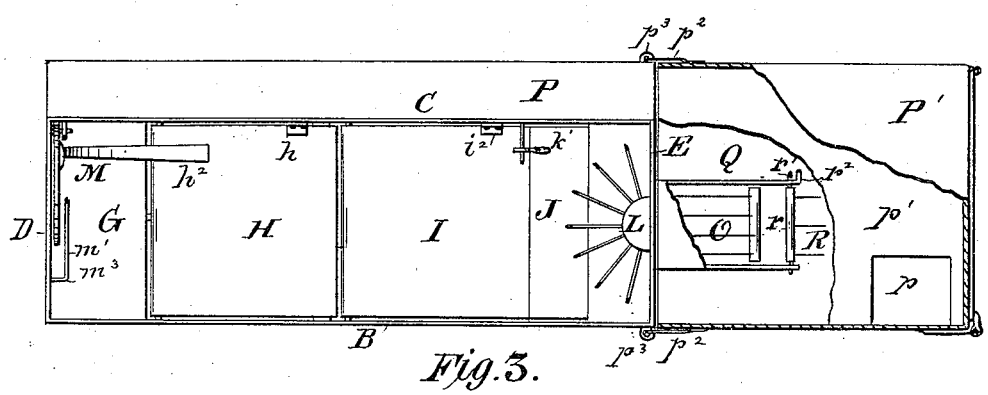
Figure 3:
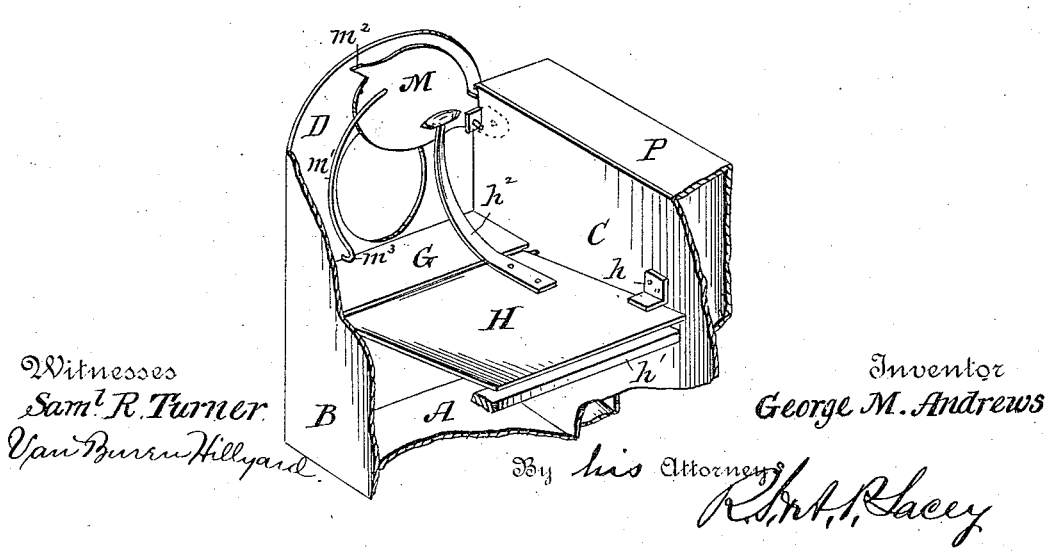
Figure 4:
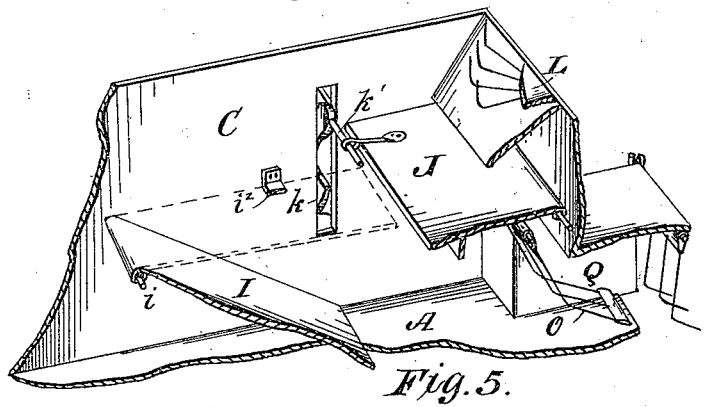
Figure 5:
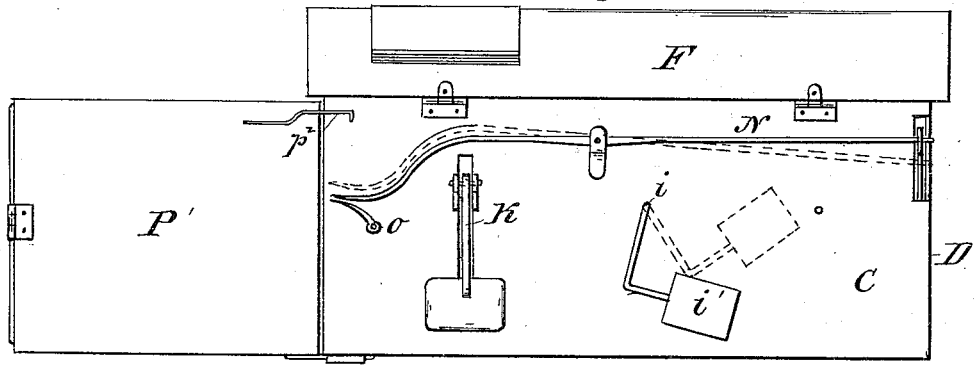
Figure 6:
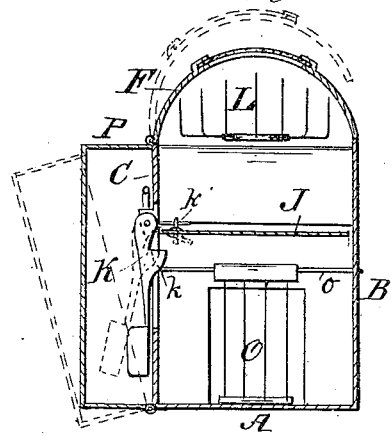

Figure 1 is a vertical longitudinal section of a trap embodying my invention, showing the operation of the several doors by dotted lines. Fig. 2 is a top plan view, the cover being removed and the cage broken away. Fig. 3 is a perspective detail view showing the operation of the door for closing the entrance. Fig. 4 is a perspective view showing the devices for supporting and releasing the trap, which drops the animal from the upper to the lower compartment. Fig. 5 is a reverse side view of the trap, the housing being removed and the operation of the weighted parts being shown by dotted lines. Fig. 6 is a cross-section of the trap about on the line X X of Fig. 1.

The case is oblong in form and is composed of the bottom A, sides B and C, ends D and E, and the hinged cover F, and is divided by platform G and the trap-doors H, I, and J into an upper and lower compartment. The trap-doors H and I are hinged at their front ends to rods, which are supported at their ends in the sides of the case. The rod $i$, to which the trap-door I is secured, is journaled in the sides of the case and is extended downward and outward and weighted at one end, as shown at $i'$, to hold the said trap-door in a horizontal position. This door I is limited in its upward movement by the stop $i^2$, and is supported on the catch $k$ on the weighted elbow-lever K against the weight of the animal. The trap-door J is hinged at its rear end and is engaged by the horizontal arm $k'$ of the weighted elbow-lever K, which arm extends through a slot in the side of the case. The bait-box L is placed above platform J in such a position that an animal will tread on the platform J in attempting to get at the bait, and is composed of a series of L-shaped rods or bars radiating from an approximately common center. The trap-door H is limited in its movements by the stops $h$ and $h'$ on the side of the case, and is provided with the arm $h^2$, that is adapted to engage with and support the pivoted door M, and is held in a normal position by the weighted arm $h^3$. The pivoted door M has an extension in the rear of its pivotal support, which is engaged by the end of the lever N, which is pivoted between its ends to one side of the case, the front end of the lever being expanded and adapted to be struck or engaged by the bent end of the rod $o$, to which the inclined door O is secured. The free end of the door M is held from inward displacement by the guard-rail $m'$, and is limited in its downward movement by the stop $m^2$ thereon engaging with an offset $m^3$ in the guard-rail.

The weighted lever K, weighted end of rod $i$, lever N, and the bent end of rod $o$ are on the same side of the case and exterior thereto, and are closed in by the housing P. The cage P has an upper and lower compartment that are in communication by reason of the opening $p$ in the horizontal partition $p'$, and is removably held to the case by the hooks $p^2$, which enter openings in the lateral ears $p^3$, and by the tongue $p^4$, which is inserted in a keeper $p^5$ on the bottom of the case. The passage Q between the trap and the cage is provided at its entrance or inner end with the inclined wire door O, and at its outer end with the wire guard R, which latter is mounted on the rod $r$, that is journaled in the sides of the passage, one end of the rod $r$ being bent at $r'$ to engage with the stop $r^2$, whereby the guard is prevented from swinging in the passage.

The operation of the trap is as follows: The door M being held open by arm $h^2$ and the bait-box supplied with the proper bait, the trap is ready for action. The animal enters the trap, and advancing to the bait-box, depressess trap-door H and disengages arm $h^2$ from door M, which closes behind the animal. In his endeavor to get at the bait the animal perches on platform I and presses with his fore feet on trap-door J, which latter, descending or tilting, withdraws the catch $k$ from beneath the trap-door I and precipitates the animal into the lower compartment. In passing from the trap to the cage through the passage Q the animal raises the door O, and through the bent end of the rod $o$ and the lever N resets the trap by opening door M. The wire guard R prevents the animal from passing from the cage back into the trap.

Having fully described my invention, what I claim, and desire to obtain by Letters Patent, is—

1. In an animal-trap, the combination, with the movable door M, having stop $m^2$, of the guard-rail $m'$, having offset $m^3$, and the weighted platform H, having arm $h^2$ to engage with and support the said door when open, substantially as and for the purpose described.

2. In a trap, the combination, with the movable door and the trap-door having an arm to support the door, of a second door connected with the entrance-door to open the same after being closed, substantially as and for the purpose described.

3. In a trap-door having an upper or lower compartment, the combination, with the trap-doors I and J, of a weighted elbow-lever having a catch to support the trap-door I and engaging with the trap-door J to retain it in a normal position, and which is operated when said trap-door J is depressed to withdraw the catch from beneath the trap-door I, substantially as described.

4. The combination, with the case having an entrance, a movable door to close said entrance, and a trap-door having an arm to engage with and support the said door, of a second door and a connection between the two doors, whereby the operation of the second door opens the entrance-door, substantially as specified.

5. The combination, with the case, the door M, the trap-doors H, I, and J, and the door O, of the weighted rod $i$, the lever N, the weighted lever K, and the bent end of the rod $o$ on the same side of and exterior to the case, and the housing P, substantially as specified.

6. A trap comprising a case, the platform G, and trap-doors H, I, and J, dividing the case into upper and lower compartments, the pivoted door M, the arm $h^2$, attached to the trap-door H for supporting door M, the weighted lever K, having catch $k$ for supporting trap-door I, the lever N, and the door O, having rod $o$ bent and adapted to operate lever N and reset trap, substantially as described.

In testimony whereof I affix my signature in presence of two witnesses.

GEORGE M. ANDREWS.

Witnesses:
E. C. ALVORD,
F. E. VAN LIEU.